Figure 1:
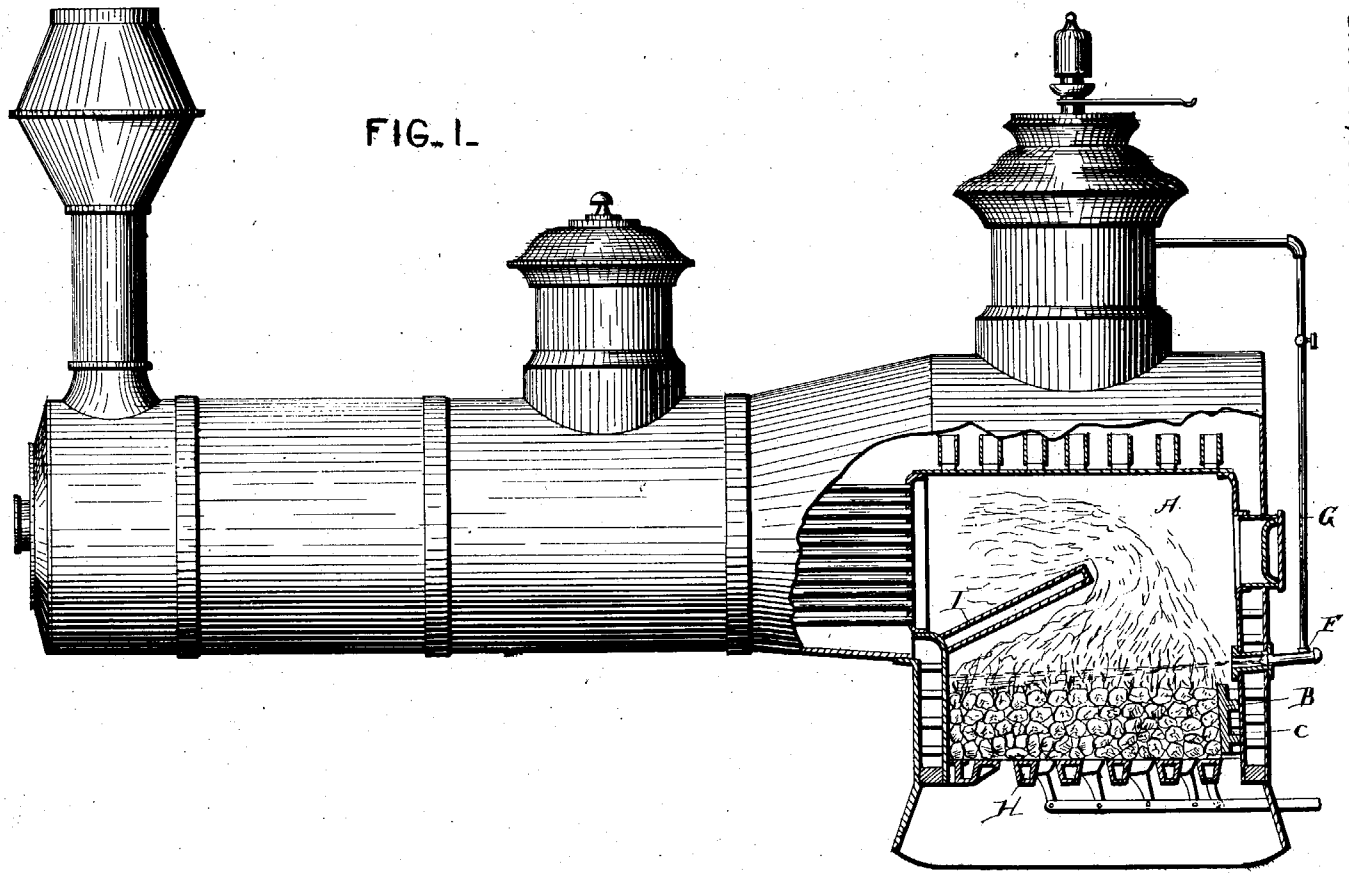

2 Sheets—Sheet 1.

B. SLOPER,

Assignor, by mesne assignments, to the AMERICAN COMBUSTION COMPANY.

STEAM BOILER FURNACE.

No. 10,538. Reissued Dec. 2, 1884.

WITNESSES
Wm. T. Gill.
Geo Cook.

INVENTOR
Byron Sloper.
By H. A. Simonson
ATTORNEY

2 Sheets—Sheet 2.

B. SLOPER,

Assignor, by mesne assignments, to the AMERICAN COMBUSTION COMPANY.

STEAM BOILER FURNACE.

No. 10,538. Reissued Dec. 2, 1884.

WITNESSES

Wm. T. Gill.

Geo Cook

INVENTOR

Byron Sloper.

By H. A. Seymour

ATTORNEY

UNITED STATES PATENT OFFICE.

BYRON SLOPER, OF NEW YORK, N. Y., ASSIGNOR, BY MESNE ASSIGNMENTS, TO THE AMERICAN COMBUSTION COMPANY.

STEAM-BOILER FURNACE.

SPECIFICATION forming part of Reissued Letters Patent No. 10,538, dated December 2, 1884.

Original No. 285,366, dated September 18, 1883. Application for reissue filed September 8, 1884.

*To all whom it may concern:*

Be it known that I, BYRON SLOPER, a citizen of the United States, residing at New York city, in the county of New York and State of New York, have invented certain new and useful Improvements in Steam-Boiler Furnaces, of which the following is a specification, reference being had therein to the accompanying drawings.

The object of the present invention is to effect as nearly as possible a complete and perfect consumption of combustible material in the fire-box of a furnace, whereby the inconvenience attendant upon the escaping smoke, sparks, and cinders is obviated, and a large saving in fuel is effected by consuming valuable heat-producing materials, which have heretofore been lost by imperfect surface-combustion and carried off by the exhaust. These objects I attain by the decomposition of a broad, thin, horizontal, or nearly horizontal, stratum of steam distributed in close proximity to the surface of a fire in conjunction with a similar stratum of air artificially and purposely heated to nearly the temperature of the fire, by which, in conjunction with the fuel, by which I cause the decomposition of the steam and free carbon arising from the ordinary imperfect combustion into carbonic-oxide gas by the union of the oxygen of the steam with said carbon, and this, together with the carbonic oxide resulting from the decomposition of the steam by contact with the incandescent fuel employed, setting free the hydrogen of the steam, will cause all the combustible products to be at once reunited and converted into aqueous vapor and carbonic acid by the instantaneous chemical reaction caused by the contact of highly heated and rarefied air accompanying and driven over with the steam into the whole fire-surface by a distributed current of steam, the steam causing the air to "hug" or to be held to the fuel, so that the disassociated elements—hydrogen and carbonic oxide—may recombine with the oxygen of the heated air without the heretofore-prejudicial action of the cold nitrogen, forming a large volume of the air on the steam, which would cool it and prevent continuous action in its decomposition. By these means the greatest possible available heat-producing materials—such as carbonic oxide, hydrogen, and free carbon in the form of smoke or sparks—are utilized in such manner as to leave the draft perfectly free without in any manner checking or impeding it and rendering spark-arresters unnecessary.

Among the advantages attendant upon my invention is the fact that, by hugging and holding the air to the fuel by the distributed stratum of steam, I am enabled to thoroughly bring about the mutual decomposition of the steam, heated air, and the carbonaceous and gaseous materials of the fuel, which have heretofore been carried off by the exhaust, and prevent the cooling of the flues of the boiler by a volume of cold nitrogen.

To illustrate my invention I refer to the accompanying drawings, which show one method of carrying my invention into effect; but various other means may be employed without departing from the spirit of my invention.

Figure 2:
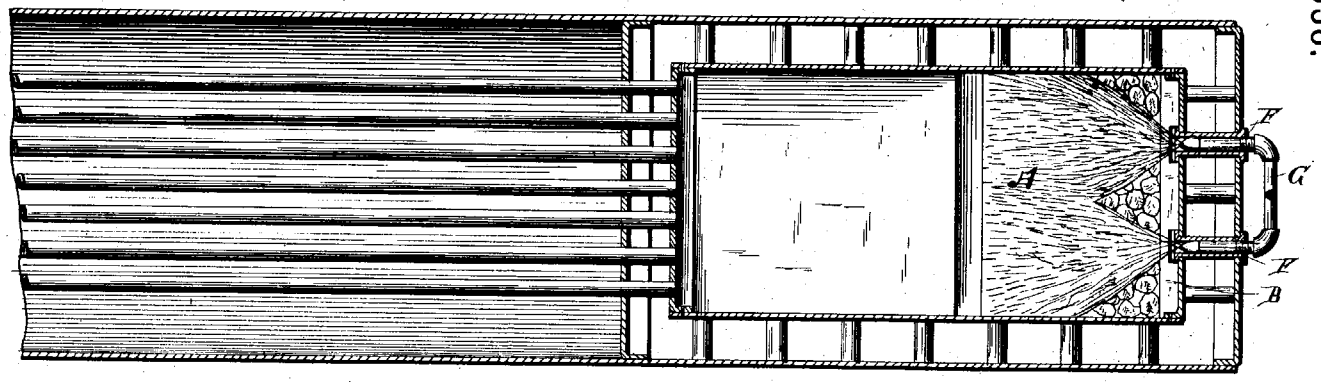
Figure 3:
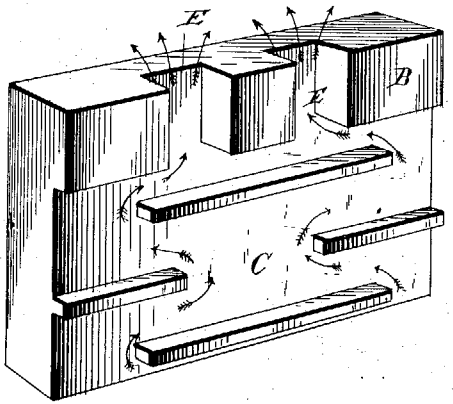

In the said drawings, Figure 1 represents a longitudinal sectional view of a boiler, showing my invention applied thereto; Fig. 2, a longitudinal horizontal section of the same, and Fig. 3 a perspective view of the tile or section through which the air passes prior to entering the furnace.

The letter A indicates the fire-box of the boiler-furnace, which may be of the usual or any approved construction.

B indicates a section or tile of any suitable refractory material having a tortuous flue, C, which extends from the water-legs at each side of the boiler, and is open to the outer air at the bottom on a line with the grate-bars, and which has openings or recesses E at the top, through which air passes, or is injected into the furnace by steam passed directly above said openings or recesses. Above said slots are one or more steam-injectors, F, extending into the furnace, being connected by means of a pipe, G, with the dome of the boiler, whereby a current of dry steam may be distributed, under pressure, in a broad, thin stratum over the stratum of air and insure the reactions hereinbefore mentioned.

The air is carried through the tile or section by the induction of the blast or current of steam, and at a temperature equal or nearly equal to that of the incandescent fuel, and is brought into conjunction with the fuel by the stratum of superimposed steam and held to the surface of the fuel or caused to hug it, so as to effect the thorough mutual reactions before mentioned.

The fuel rests upon the grate-bars H, as usual, and the strata of steam and air are forced from the rear forward near the surface horizontally, or nearly horizontally, so as to not force the gases into the fuel too much, but carry them off and assist the draft of the exhaust.

The steam and air are carried under the fire-bridge (indicated by the letter I) to the rear of the furnace; but in some instances, where the length of the fire-box is considerable, an additional tile or section and injectors may be located at the front of the fire-box, so as to effectually subject the fuel to the action of the steam and air.

By practical experience I have found that, in order to successfully and continuously decompose steam on the surface of carbonaceous material it is of the utmost importance that the fuel upon which the steam impinges must be kept at an incandescent white heat, in order for the oxygen of the steam to unite with the free carbon of the fuel, otherwise the steam will pass off undecomposed and become an injury to the fire. By my process of bringing the air in contact with the steam in such a highly-heated state the large contained volume of nitrogen is prevented from cooling the steam and fuel and counteracting the beneficial effects of the oxygen and preventing thorough decomposition. Thus I am able by this method to keep the surface of the fuel at a white heat, and keep up and maintain the reaction and decomposition continuously from the start.

Having thus described my invention, what I claim, and desire to secure by Letters Patent, is—

The herein-described process of promoting the surface-combustion of fuel by the decomposition of steam in connection with heated air, both the steam and air being delivered over and upon the fuel within the fire-box in a compound stratum consisting of a stratum of steam and a stratum of air, substantially as set forth.

BYRON SLOPER.

Witnesses:
GILMAN E. JOPP,
EDWD. B. BIGELOW.